United States Patent
Frost et al.

[11] Patent Number: 5,123,240
[45] Date of Patent: Jun. 23, 1992

[54] METHOD AND APPARATUS FOR EJECTING FOREIGN MATTER FROM THE PRIMARY FLOW PATH OF A GAS TURBINE ENGINE

[75] Inventors: Wilson Frost, Fairfield; Peter J. Wood; Melvin Bobo, both of Cincinnati; Daniel R. Little, West Chester, all of Ohio

[73] Assignees: General Electric Co., A New York Corp.; John R. Rafter, both of Cincinnati, Ohio

[21] Appl. No.: 495,660

[22] Filed: Mar. 19, 1990

[51] Int. Cl.⁵ .............................. F02G 3/00
[52] U.S. Cl. .................. 60/39.02; 60/39.092; 60/39.093; 55/306; 244/53 B
[58] Field of Search ............ 60/39.02, 39.092, 39.093, 60/39.07; 415/121.2; 55/306; 244/53 B

[56] References Cited
U.S. PATENT DOCUMENTS

| | | | |
|---|---|---|---|
| 4,070,827 | 1/1978 | VanFleet | 60/204 |
| 4,463,552 | 8/1984 | Monhardt et al. | 60/226.1 |
| 4,844,489 | 7/1989 | Seed | 415/169.1 |

FOREIGN PATENT DOCUMENTS

| | | |
|---|---|---|
| 0103384 | 3/1984 | European Pat. Off. . |
| 0374004 | 6/1990 | European Pat. Off. ......... 60/39.092 |
| 2518169 | 6/1983 | France . |
| 0624402 | 6/1949 | United Kingdom . |
| 0785721 | 11/1957 | United Kingdom . |
| 0870182 | 6/1961 | United Kingdom . |
| 1122684 | 8/1968 | United Kingdom . |
| 1258299 | 12/1971 | United Kingdom . |
| 1417154 | 12/1975 | United Kingdom . |
| 2047815 | 12/1980 | United Kingdom . |
| 2074655 | 11/1981 | United Kingdom . |
| 2216855 | 10/1989 | United Kingdom . |

*Primary Examiner*—Louis J. Casaregola
*Assistant Examiner*—Michael I. Kocharov

[57] ABSTRACT

A method and apparatus are disclosed for treating ice and debris in a gas turbine engine. More particularly, a specially configured and slidable scoop is positioned between the booster exit and the compressor inlet in a gas turbine engine. An actuator mechanism can be coupled through a linkage to the scoop to position the scoop within the core path at low power conditions and retract the scoop from the core flow path at high power conditions.

11 Claims, 7 Drawing Sheets

METHOD AND APPARATUS FOR EJECTING FOREIGN MATTER FROM THE PRIMARY FLOW PATH OF A GAS TURBINE ENGINE

This invention relates to internal combustion engines, and more particularly to gas turbine engines associated with aircraft propulsion. In a preferred embodiment this invention relates to a method and apparatus for the removal and ejection of foreign matter such as ice and debris from the primary or core flow path proximate the compressor inlet of a gas turbine engine into the secondary or bypass flow path.

Gas turbine engines can suffer from combustion instabilty problems when large quantities of ice particles enter the core particularly when the engine is being operated at low power and low thrust operating conditions which are established when the engine is operated at idle.

It has been found that ice most seriously impacts the core after the booster stage. More particularly ice has been found to build up in the outer 10% of the annulus as a result of centrifugal effects.

Although the present invention is specifically directed to an ejection scoop for use in controlling ice build up, it is recognized that the scoop of the present invention is capable of and does in fact result in the removal and ejection of other debris or foreign matter from the core of gas turbine engine.

U.S. Pat. No. 4,070,827 to Vanfleet et al. for a Method and Apparatus For Limiting The Ingestion Of Debris Int The Inlet Of A Gas Turbine Engine is directed to a special engine configuration for eliminating or avoiding the vacuum effect otherwise associated with the inlet of a gas turbine engine. The patent addresses the debris problem by attempting to reduce the amount of debris particles which enter the core and does not attempt to remove from the core any particles which have previously entered the core. This document does not specifically address an internal ice and debris problem and does not teach the use of specially configured ice and debris ejection scoop situated between the primary and secondary flow paths of a gas turbine engine.

It is also recognized that gas turbines engines typically include actuator valves such as variable bleed valves (VBV) which can be located between the booster exit and the compressor inlet of a gas turbine engine to bleed a portion of the core air and into the bypass flow path and cause a portion of the entrained debris to exit the core. In conventional applications the variable bleed valve includes a plurality of substantially planar doors situated between the booster exit and the compressor inlet. Typically the engine can employ a dozen or more doors which can be circumferentially disposed at more or less equal intervals about the engine core. Ice ingestion tests however have shown that the variable bleed valve doors can become restricted and or blocked by accreted ice.

Accordingly an unfulfilled need exists to provide an improved gas turbine engine including means for removing and ejecting ice, debris and other foreign matter from the core flow path.

SUMMARY OF THE INVENTION

The present invention recognizes that foreign matter such as ice and debris can and will enter a gas turbine engine in the course of normal operation and that such foreign matter can enter the core area particularly at idle or lower power operating conditions. While it is certainly desirable to avoid the intake of such material it is equally important to segregate, remove, divert and eject any such material which may have entered the engine. The present invention is specifically directed to addressing the segregation, removal and ejection of foreign matter such as ice and debris which may have entered a gas turbine engine.

The present invention provides a specially configured ejection scoop for capturing and removing ice, debris and other foreign matter which may have entered into the engine and reside in the primary or core flow path. The present invention provides for removing ice, debris and other foreign matter from the primary flow path and diverting and ejecting the foreign matter into the secondary or bypass flow path and out of the engine. The scoop can be slidably mounted on a series of guides or parallel tracks fixedly mounted to the engine through a mounting block positioned between the primary and secondary flow paths. The scoop can be pivotably connected through a linkage to an actuator mechanism such as a variable bleed valve actuator which can be used to reposition the scoop in the core flow path or alternatively to store the scoop in a non active position by retracting the scoop fully or partially out of the core flow path. A method in accordance with the present invention provides for the segregation, removal, diversion and ejection of ice and debris from the primary flow path of a gas turbine engine and includes the steps of providing an arc shaped scoop which can be slidably mounted between the primary and secondary flow paths, providing an actuator mechanism coupled through a linkage to the said scoop proximate the secondary flow path and activating said actuator mechanism at low power conditions to protrude the scoop into said primary flow path and encourage ice and debris to flow from the core flow path into the bypass flow path.

The amount of air flowing through the diversion path and over the ejection scoop can be controlled by the adjusting the opening of the bleed valve door.

In a preferred embodiment the scoop is shaped as a smooth arc having a radius defined by the axial and radial distance between the scoop lip and the terminus of the variable bypass valve area.

DESCRIPTION OF THE DRAWINGS

The above and other objects and features of the present invention will be apparent from a reading of the following description when taken in conjunction with the accompanying drawings wherein;

FIG. 3 including

FIG. 4 including

DETAILED DESCRIPTION OF THE PREFERRED EMBODIMENT

It has been recognized that gas turbine engines can and will ingest foreign matter including debris and ice into the core flow path. Such ingestion can be troublesome particularly at low power conditions. It is therefore desirable to provide a means for capturing and removing the foreign matter from the primary flow path and diverting and ejecting the collected material from the core path into the bypass flow path to enhance engine operation.

Figure 1:
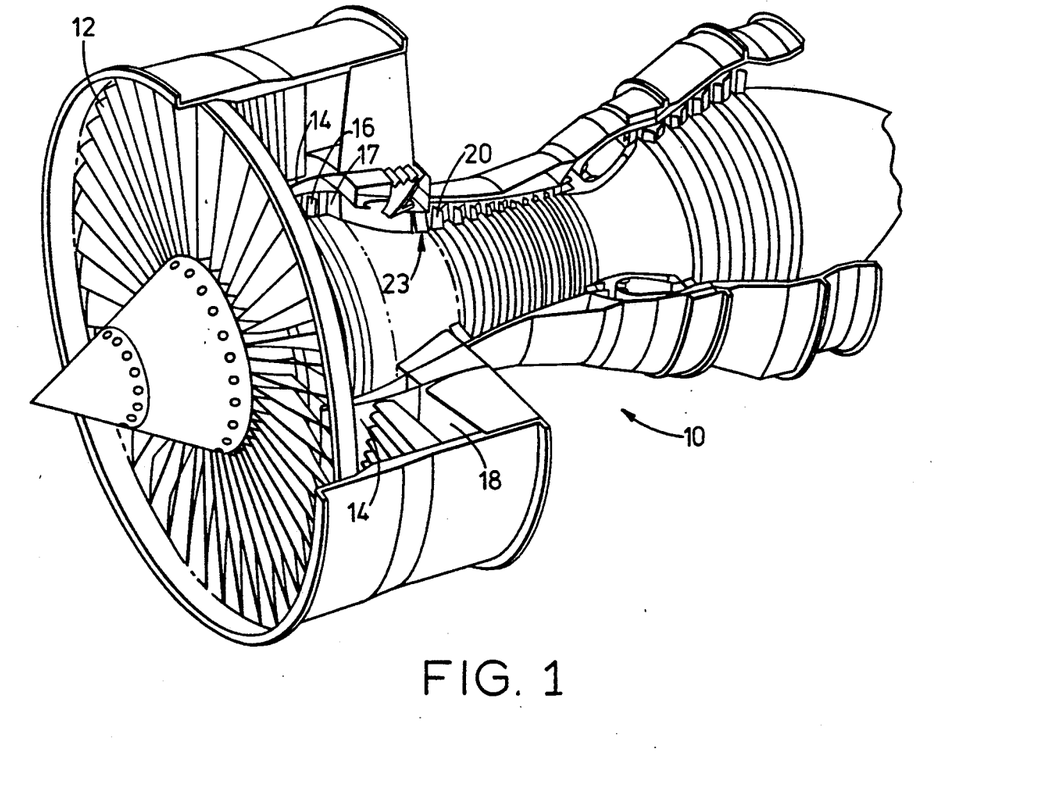
FIG. 1 is a perspective schematic representation of a gas turbine engine partially in cut away.
Figure 2:
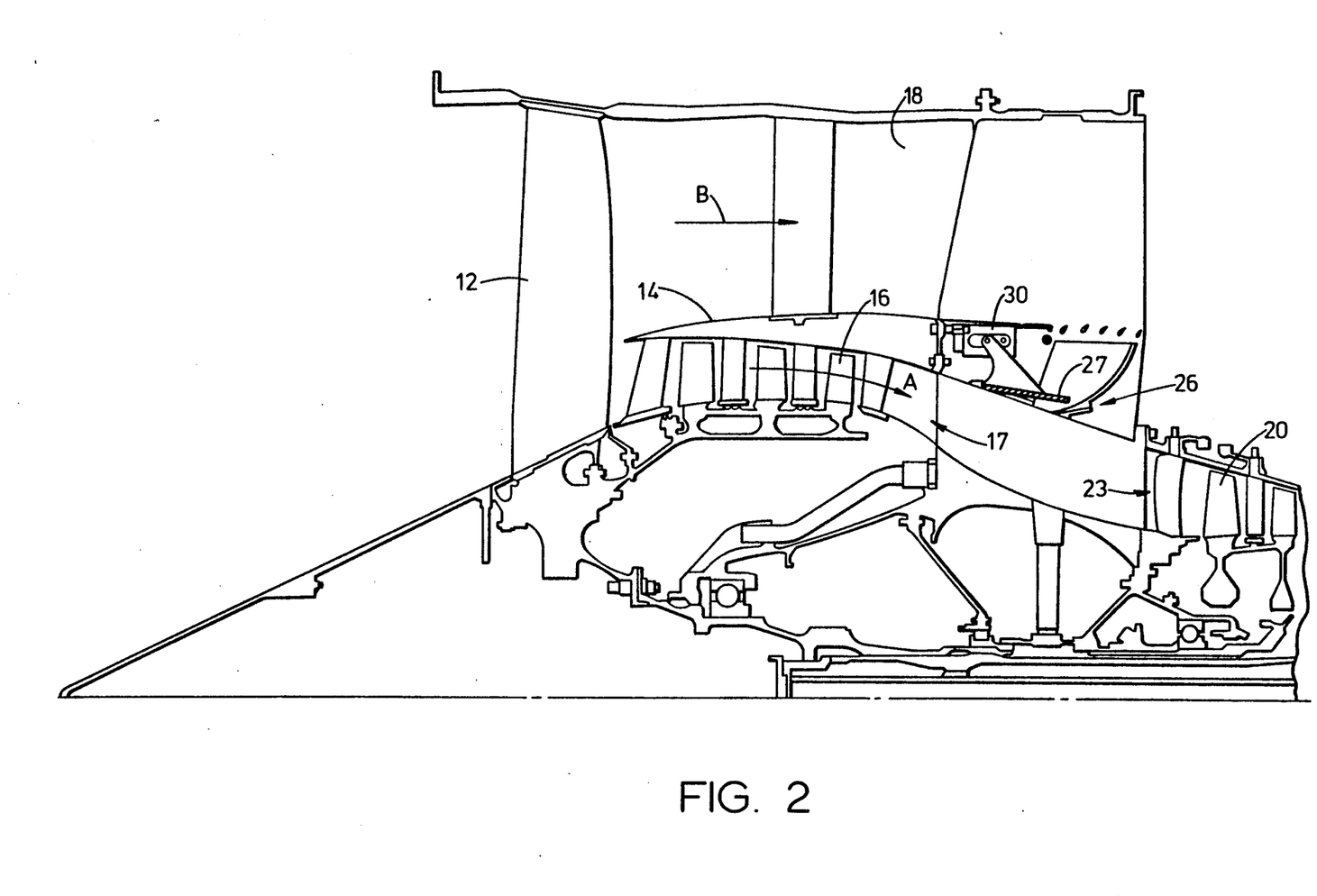
FIG. 2 is an enlarged illustration of a gas turbine engine particularly illustrating a variable bleed valve.
Figure 3A:
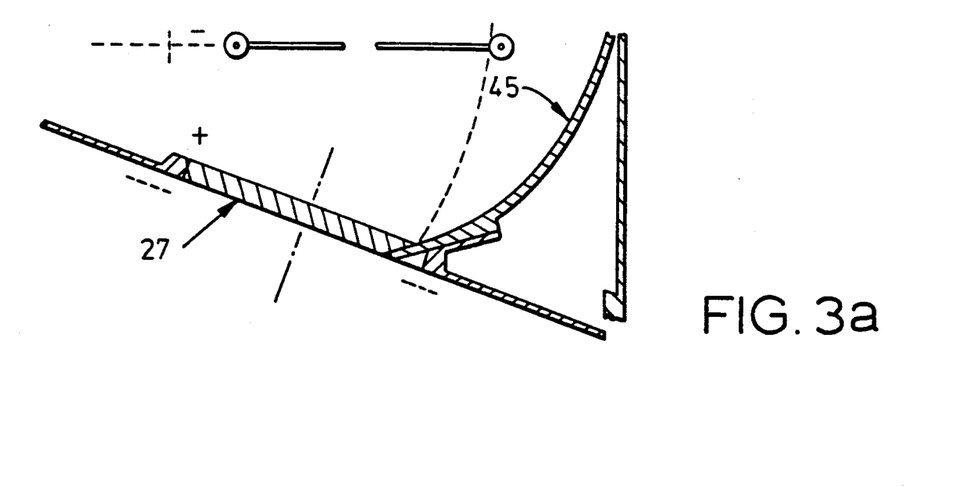
FIGS. 3a–3e illustrates the positions of the variable bleed valve door during operation.
Figure 3B:
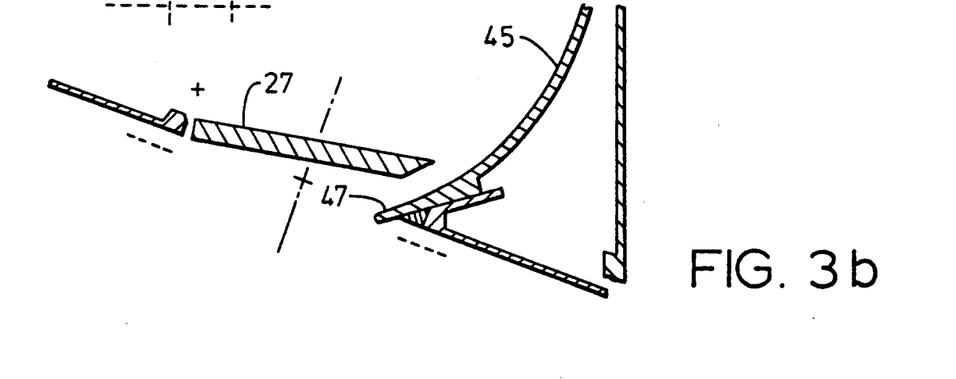
Figure 3C:
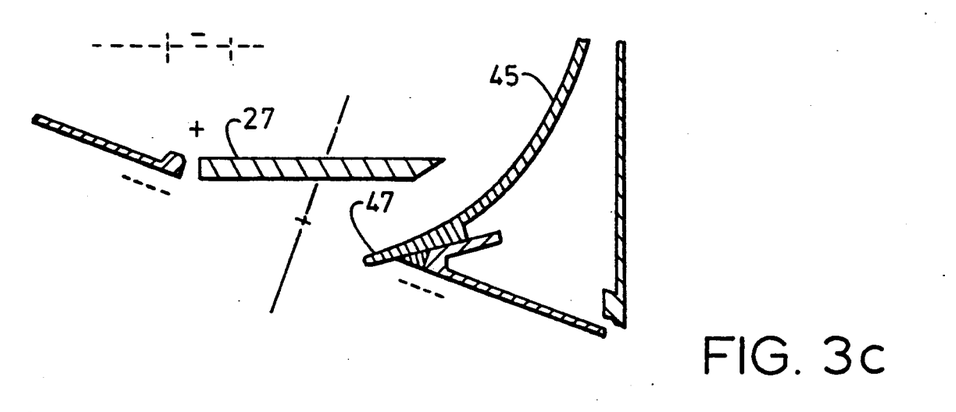
Figure 3D:
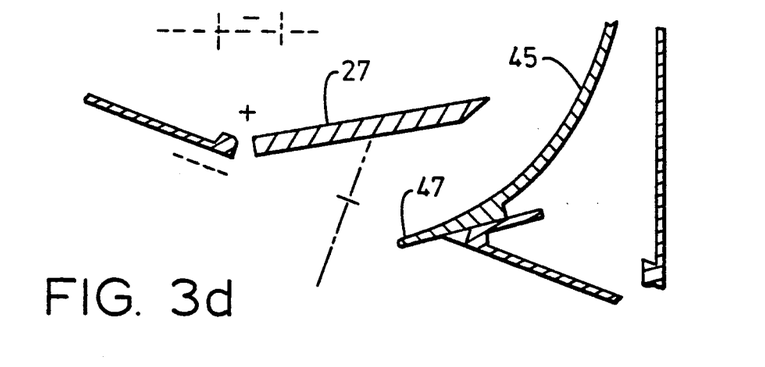
Figure 3E:
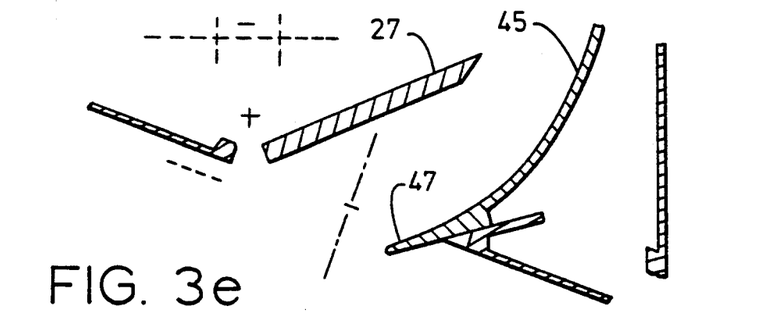

Referring now to FIG. 1, a perspective schematic representation of a typical gas turbine engine 10 is shown partially in cut away. In major portions, this engine includes a fan section 12, a separator 14, a booster 16, a bypass section 18 and a compressor 20. The booster outlet and compressor inlet are designated 17 and 23 respectively. As is shown in FIG. 2, variable bleed valves 26 can include operable doors 27 which can be mechanically opened by a bleed valve torque drive rod (not shown) which can be driven by the engine and controlled by an appropriate sensing mechanism. Arrow A indicates the primary or core flow path and arrow B indicates the bypass flow path.

Referring now to FIG. 2, an enlarged detailed cross sectional illustration of a portion of a typical gas turbine engine (which does not necessarily correspond with FIG. 1) is shown. This engine can include a variable bleed valve actuator 30 for operating a hinged bleed valve door 27 situated between a booster exit 17 and compressor inlet 23 to allow a portion of the core air and debris to leave the core. Ice ingestion tests have shown however, that bleed valve doors can become restricted and/or blocked with accreted ice and the preferred operation of the doors can become impaired.

FIG. 3, including FIGS. 3a, 3b, 3c, 3d and 3e show various relative positions of the bleed valve door 27 and a preferred scoop 45 in accordance with the present invention. It is to be noted that as the door 27 opens further, the scoop 45 protrudes a greater distance into the door opening and the core area. FIGS. 3a, 3b, 3c, 3d, and 3e, illustrate door angles of 0, 10, 20, 30, and 40 degrees, respectively.

Referring now to FIG. 4, an actuator mechanism in accordance with the present invention is shown as including a direct linkage 40 from the variable bleed valve door actuator 32 to a scoop 45 which is slidably mounted in a mounting block 50 by appropriated tracks or guides (not shown).

As illustrated, the linkage is directly coupled to a portion of the scoop 45 proximate the bypass flow path to allow the scoop 45 to be pushed into and pulled out from the core flow path. More particularly, the sliding motion of the scoop takes it from a retracted position where it may not protrude into the core flow path to an extended position where the lip region 55 of the scoop protrudes into the core flow path (see FIG. 4a). The direct linkage mechanism can be coupled to the trailing portion 46 of the scoop 45 proximate or adjacent to the bypass flow path. Under the circumstance when the variable bleed valve door actuator 30 and door 27 are in a closed position, (FIG. 4b) the scoop assumes a retracted position and the protrusion of the scoop 45 into the core flow path is reduced or eliminated. It is preferred that the scoop assume a fully retracted position although protrusions of an inch or more can be accommodated. Alternatively when the variable bleed valve door 27 and actuator 30 are in an open position, the scoop 45 has been slid in its mounting into an intended position wherein the scoop protrudes into the core flow path. The forward edge 47 of the scoop 45 can capture and remove foreign matter such as ice and debris from the core or primary flow path of a gas turbine engine. The scoop is specially configured to divert and eject foreign matter from the primary flow path.

Figure 4A:
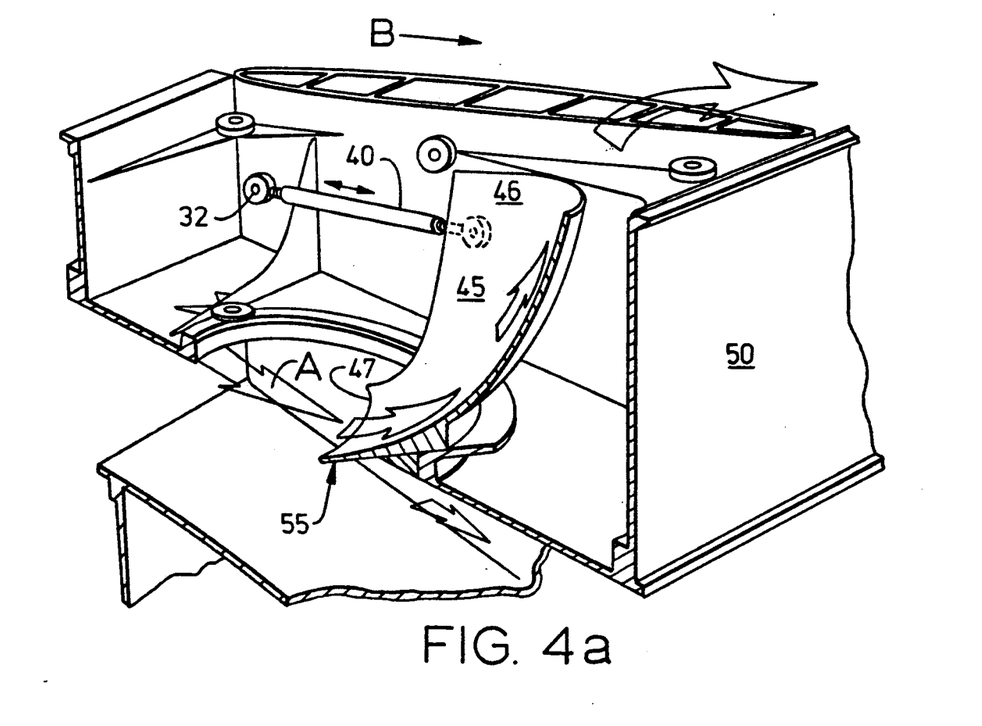
FIGS. 4a and 4b is a detailed illustration of an ejection scoop in accordance with the present invention showing an extended position and a retracted position.
Figure 4B:
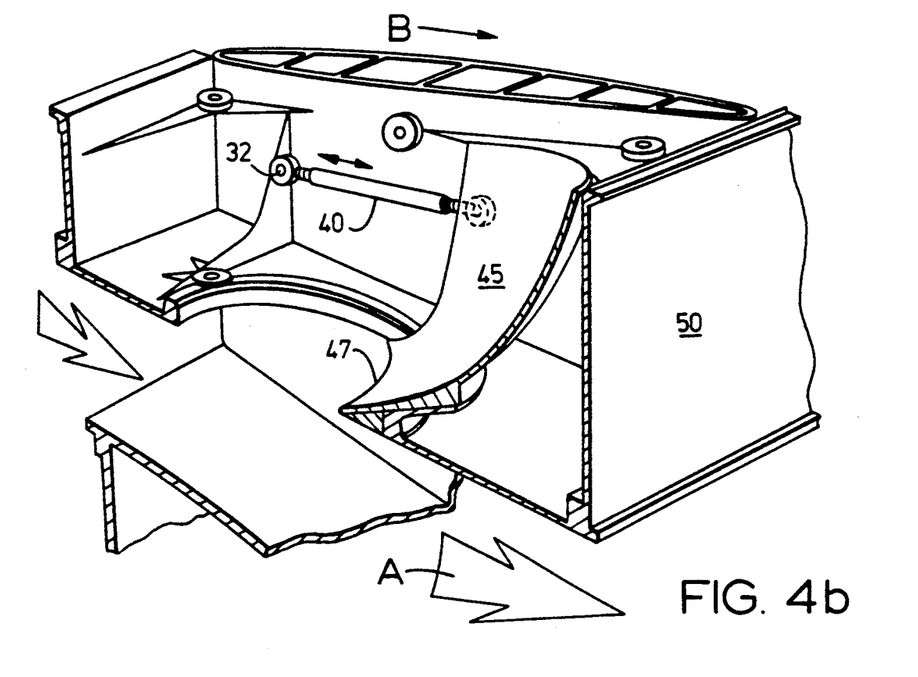

In a preferred embodiment the scoop has an arc shaped configuration to ensure that the foreign matter does not clog the scoop and that the scoop can continue to function in a desired manner to divert and eject foreign matter such as ice and debris from the core flow path into the bypass flow path. The scoop mechanism is specially designed to increase its capture area or the surface area exposed to the primary flow path when the scoop 45 assumes an extended or operational position at low power engine operating conditions and has reduced or minimal aerodynamic implications when the scoop 45 assumes at retracted or stored position at high power engine operating conditions. It will be recognized that at high power conditions the engine is not high susceptible to ice ingestion issues.

Figure 5:
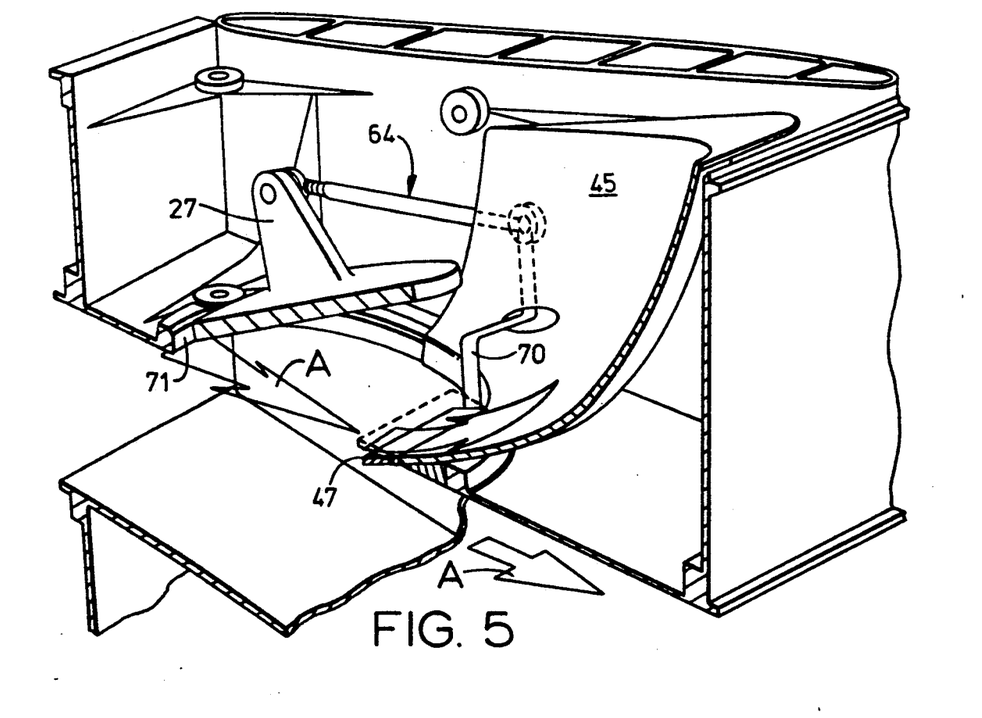
FIG. 5 is an illustration of an alternate embodiment of the ejection scoop of the present invention.

As illustrated in FIG. 5, the sliding scoop concept can be alternately implimented by a scoop 45 and an actuator linkage 64 which is connected to the door 27 by an arm 70. The hinge 71 places the plate flush with the outer annulus of the ice ejection system and is not operational.

Figure 6:
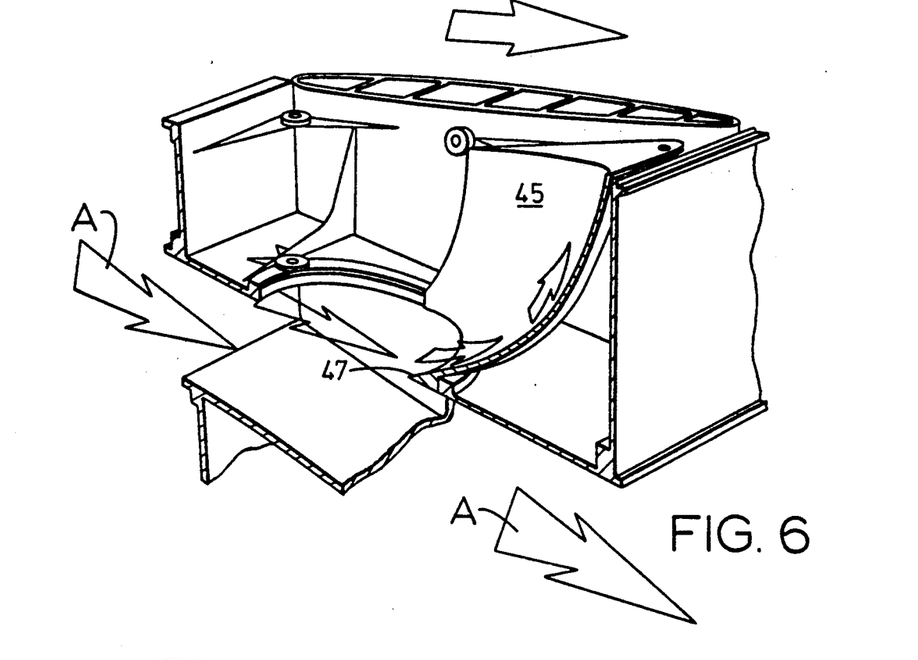
FIG. 6 illustrates a further embodiment of a scoop in accordance with one embodiment of the present invention.

Referring now to FIG. 6, an illustration of a preferred and specially configured scoop 45 in accordance with the present invention is shown. More particularly, as illustrated in FIG. 6 all portions of the scoop that are likely to be impacted by ice, and particularly all leading edges 47 of the scoop 45 can be designed to insure that the ice impact angle or the angle between the primary flow path vector and the leading edge of the scoop is 25 degrees or less. This special configuration ensures that ice which is concentrated in the outer 10 percent of the core due to the booster effects does not stick and hence cannot grow on the back of the variable bleed door hole.

Moreover this design shape results in steady and substantially non turbulent bleed airflow and hence the ice at no point encounters stagnated flow areas that could result in ice build up. The scoop shape preferrably consists of a smooth circular arc which extends form the variable bleed valve door hole to the exit into the bypass stream. In a preferred embodiment this arc is developed into a bowl shaped surface which extends towards the sides of the variable bleed valve hole. The radius of the curve of the scoop is as large as possible to keep the ice impact angle as large as possible while maintaining an effective ice impact angle to ensure discharge into the bypass flow path.

It is to be recognized that the shape of the scoop is a primary factor in achieving the swift removal of ice and debris from the core flow path and ejecting such material into the bypass duct where it does not compromise engine stability.

The mechanism of the present invention increases the capacity of gas turbine engines to ingest foreign matter such as ice into the core without loss of engine stability. The mechanism of the present invention also reduces the build up of potentially hazardous lumps of ice in the variable bleed valve door hole.

The invention, in conjunction with the centrifugal effect of the booster, becomes an effective remover of debris before it reaches the compressor and improves the general wear resistance of the engine and its susceptability to damage from foreign objects.

Figure 7:
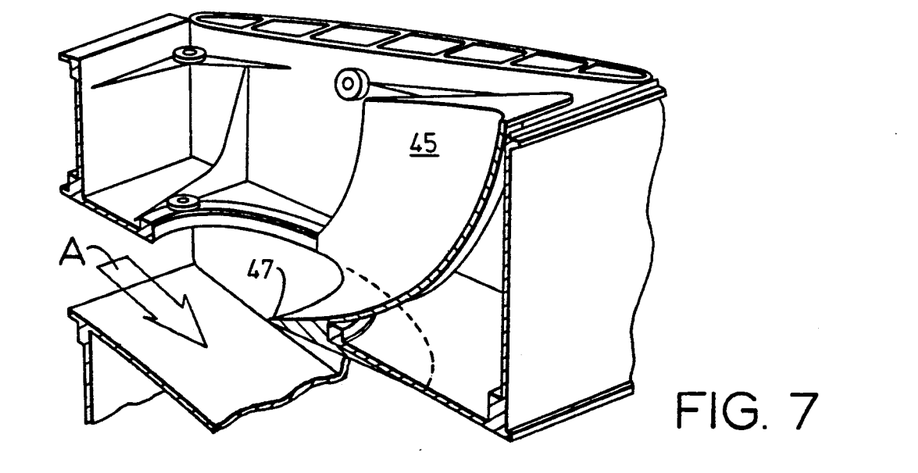
FIG. 7 illustrates a further embodiment of a scoop in accordance with one embodiment of the present invention.

With reference to FIG. 7, an improved resistance to ice buildup can be achieved by providing an icephobic coating which can be used along with heating of the scoop itself either by hot bleed air or by electrical resistance type heating.

Figure 8:
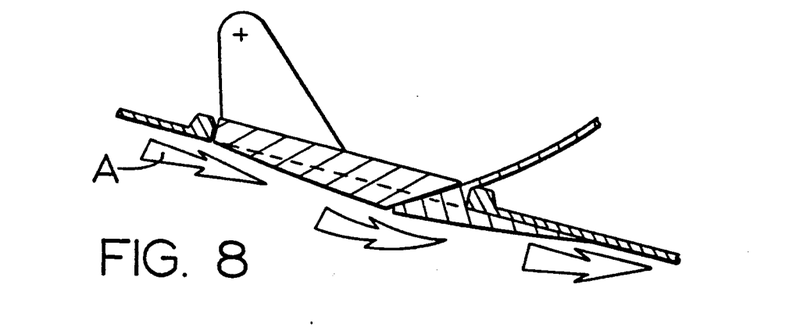
FIG. 8 illustrates a specially configured bleed valve door in combination with an embodiment of a scoop in accordance with one embodiment of the present invention.

As is shown in FIG. 7, the effectiveness of the present invention can also be increased by allowing the forward edge lip 47 of the scoop 45 to protrude into the primary flow A to ensure that the scoope receives a cleaning flow during engine operation. An increased effectiveness of the present invention can be achieved in some applications by allowing the lip 47 of the scoop 45 to permanently protrude into the flow. This permanent protrusion must be aerodynamically faired to avoid any aeromechanical influences on the downstream blading. The fairing can include a change to an alternate variable bleed valve door design which is shown in FIG. 8 to give the front half of the door a blister type shape when the door is in closed position.

Figure 9:
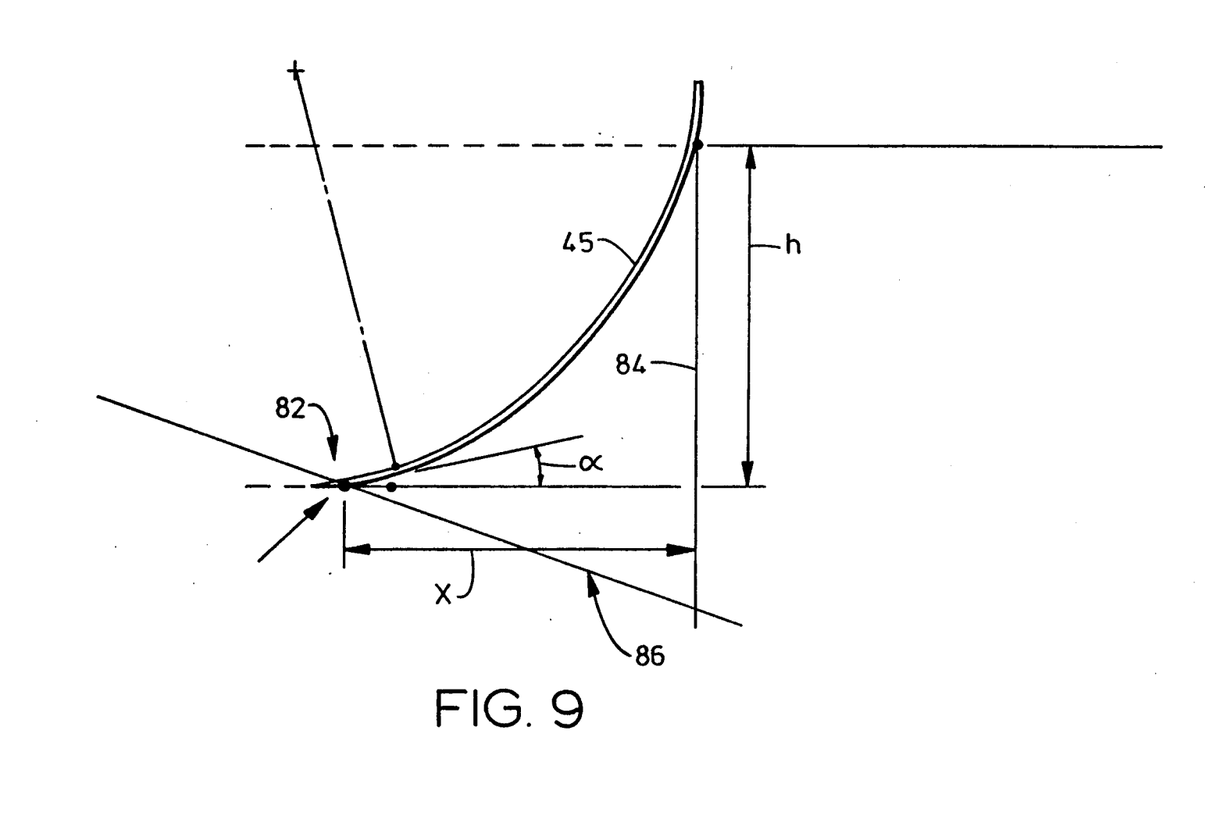
FIG. 9 illustrates a cross-sectional view of a scoop in relation to the annulus of the core and the bypass stream.

As shown in FIG. 9, and in a preferred embodiment the radius of the scoop 45 can be defined by an equation involving the position of the scoop lip 82 and the VBV box rear wall 34. The point intersection of the scoop lip with the outside annulus of the core 86 forms an angle. The intersection is separated from the back wall of the VBV box by an axial distance of x. The point of intersection is separated from the bypass stream by a radial distance h. The angle between the tangent to the scoop at the intersection point (between the scoop and the outer annulus) and the engine center line is alpha. The radius of curvature of the scoop can be defined by the following equation (1):

$$R = \frac{a^2 + b^2}{2b}$$

$$a = (x - 1)\cos\alpha + (h - \sin\alpha)\sin\alpha$$

$$b = (h - \sin\alpha)\cos\alpha - (x - 1)\sin\alpha$$

The radius of curvature should not however exceed the value defined by the maximum radius equation (2) given as follows:

$$R_{max} = \frac{(x - 1)}{(1 - \sin\alpha)}$$

Throughout the present disclosure the scoop 45 has been referred to in the singular because only a single scoop has been discussed. Nevertheless one skilled in the art will appreciate that a scoop can be effectively associate with each bleed valve. Thus a typical engine having 12 bleed valves, could also advantageously include 12 scoops 45 with one scoop being associated with each bleed valve.

Although the preferred embodiments of the present invention have been heretofore described, other forms and arrangements of the foreign matter debris ejection scoop of the present invention are possible and will readily apparent based on the present disclosure to those skilled in the art and thus come within the scope of the present invention as defined by the appended claims.

What is claimed is:

1. In a gas turbine engine, the method for ejecting foreign matter from the core flow path into the bypass flow path comprising the steps of:
   (a) providing a scoop slidably mounted in a block between said core flow path and said bypass flow path;
   (b) providing an activator mechanism for repositioning said scoop; and
   (c) activating said activator mechanism at low power levels to protrude said scoop into said core flow path and to cause ice and debris which otherwise exist in said core flow path to be ejected from said core flow path into said bypass flow path.

2. The method of claim 1 wherein said step of providing an activator mechanism comprises the further steps of:
   (i) providing a variable bleed valve actuator;
   (ii) providing a direct linkage from a portion of said scoop adjacent said bypass flow path to said variable bleed valve actuator.

3. In a gas turbine engine, the method for ejecting foreign matter from the core flow path into the bypass flowpath comprising the steps of:
   (a) providing a scoop slidably mounted in a block between said core flow path and said bypass flow path;
   (b) providing an activator mechanism for repositioning said scoop, wherein said step of providing an activator mechanism comprises the further steps of:
      (i) providing a variable bleed valve actuator which controls a variable bleed valve door;
      (ii) providing a direct linkage from a portion of said scoop adjacent said bypass flow path to said variable bleed valve actuator;
      (iii) providing a coupling between said linkage and said variable bleed valve actuator;
      (iv) providing a coupling between said linkage and said scoop; and
   (c) activating said activator mechanism at low power levels to protrude said scoop partially across said core flow path and to cause ice and debris which otherwise exist in said core flow path to be ejected from said core flow path into said bypass flow path.

4. The method of claim 3 including the steps of:
   (i) characterizing a primary air flow in the core flow path by a core flow vector;
   (ii) characterizing said scoop by a vector tangent to a leading edge of said scoop; and
   (iii) aligning said scoop to provide an ice impact angle of 25° or less wherein said ice impact angle is defined as the angle between said core flow vector and said scoop leading edge tangent vector.

5. In an aircraft engine having core and bypass flow paths, an apparatus for ejecting foreign matter from the core flow path into the bypass flow path, said apparatus comprising a moveable scoop slidably mounted in said gas turbine between the primary flow path and the bypass flow path, said scoop being configured as a smooth circular arc and being slidably mounted adjacent a core flow path bleed valve door between said core flow path and said bypass flow path.

6. The apparatus of claim 5 wherein said scoop has an iceophobic coating.

7. In an aircraft engine having core and bypass flow path, an apparatus for ejecting ice and debris from the core flow path into the bypass flow path, said apparatus comprising:
  (a) a movable scoop slidably mounted in said gas turbine between a primary core flow path and a bypass flow path, said scoop being configured as a smooth circular arc and being slidably mounted adjacent a variable bleed valve door and said bypass flow path;
  (b) a variable bleed valve actuator for opening said variable bleed valve door, thereby venting said primary core flow path during low power operation;
  (c) a linkage having a first end and a second end wherein:
    (i) said linkage first end is connected to a portion of said movable scoop adjacent to the bypass flow path; and
    (ii) said linkage second end is coupled to said variable bleed valve actuator for driving said scoop to protrude into said primary flow path when said door is open.

8. The apparatus of claim 7 wherein said core flow path is characterizable by a vector indicating a primary direction of flow; and said scoop includes a leading edge having a vector tangent thereto, said tangent vector forming an angle of 25° or less with said core flow path vector, whereby ice is prevented from accumulating on said leading edge when said variable bleed valve door is opened.

9. An apparatus for ejecting foreign matter from into the bypass flow path of a gas turbine engine said apparatus comprising a mounting block situated between a primary core flow path and a bypass flow path in said gas turbine, a scoop comprising a smooth arc situated in said mounted block, between said primary flow path and said secondary flow path having a first edge proximate said primary path and a second edge proximate said bypass flow path, a linkage mechanism coupled to said second edge for driving said scoop into said primary flow path during low power operation.

10. The apparatus of claim 9 wherein said linkage includes a variable bleed valve actuator having a sensor for determining engine RPM and compressor delivery pressure and in response thereto providing mechanical activity and said variable bleed valve being coupled to said linkage.

11. The apparatus of claim 9 wherein said scoop has an iceophobic coating.

* * * * *

UNITED STATES PATENT AND TRADEMARK OFFICE
CERTIFICATE OF CORRECTION

PATENT NO. : 5,123,240
DATED : June 23, 1992
INVENTOR(S) : Wilson Frost, et al It is certified that error appears in the above-indentified patent and that said Letters Patent is hereby corrected as shown below:

On the title page, Item [73]: Assignee, second line, delete "John R. Rafter, both of"
On the title page, Column 2, before "Abstract" add
---Attorney, Agent, or Firm - Jerome C. Squillaro; John R. Rafter---
In addition, the Certificate of Correction will show:
Title page, Assignee: delete "A" New York Corp.;"

Signed and Sealed this

Twenty-fifth Day of January, 1994

Attest:

BRUCE LEHMAN

*Attesting Officer*  *Commissioner of Patents and Trademarks*